US006193382B1

(12) United States Patent
Gilmer

(10) Patent No.: US 6,193,382 B1
(45) Date of Patent: Feb. 27, 2001

(54) APPLIANCE LIGHTING DEVICE

(76) Inventor: Jan C. Gilmer, P.O. Box 400, Howard Lake, MN (US) 55349

( * ) Notice: Subject to any disclaimer, the term of this patent is extended or adjusted under 35 U.S.C. 154(b) by 0 days.

(21) Appl. No.: 09/301,850

(22) Filed: Apr. 29, 1999

Related U.S. Application Data

(60) Provisional application No. 60/083,774, filed on May 1, 1998, and provisional application No. 60/096,612, filed on Aug. 14, 1998.

(51) Int. Cl.[7] .............................. G01D 11/28

(52) U.S. Cl. .............................. 362/23; 362/186; 362/376

(58) Field of Search .............................. 362/23, 25, 89, 362/90, 91, 186, 208, 92, 376

(56) References Cited

U.S. PATENT DOCUMENTS

| | | | | |
|---|---|---|---|---|
| 1,243,608 | * | 10/1917 | Johnson | 362/25 |
| 1,462,012 | * | 7/1923 | Kaplon | 362/25 |
| 1,871,527 | * | 8/1932 | Hurley | 362/25 |
| 2,279,341 | * | 4/1942 | Powell | 362/89 |
| 4,895,455 | | 1/1990 | Horning | 374/208 |
| 5,113,318 | | 5/1992 | Conley | 362/23 |
| 5,491,615 | | 2/1996 | Nichols | 362/23 |
| 5,683,350 | * | 11/1997 | Paul et al. | 362/186 |

* cited by examiner

*Primary Examiner*—Alan Cariaso
(74) *Attorney, Agent, or Firm*—Anthony G. Eggink

(57) ABSTRACT

A lighting device for momentarily providing light to an appliance to which it is mounted. The lighting device has a nonconductive base structure adapted to be mounted onto the appliance or to be incorporated into the appliance or other appliance engaging structure. The base structure has a cavity, a retaining slot and apertures into which a battery, a light bulb and a conductive connector structure are placed. The conductive connector structure has a switch which extends from the base structure and through the exterior cover. The cover is constructed to receive the base structure and has a forwardly extending hood which is adapted to direct light to the appliance. Various mounting structures are provided for attaching the lighting device to an appliance or other objects.

20 Claims, 9 Drawing Sheets

APPLIANCE LIGHTING DEVICE

This application claims the benefit of U.S. Provisional Application Nos. 60/083,774 and 60/096,612 filed on May 1, 1988 and Aug. 14, 1998, respectively.

BACKGROUND OF THE INVENTION

This invention relates generally to lighting devices. More particularly, this invention relates to lighting devices for temporarily providing light to appliances, such as thermostats, VCR's, telephone caller ID's and the like as well as to provide light to designated areas and for use as a portable light source.

Electrical and electronic appliances are often difficult to read and, therefore, to properly set and control. For example, thermostats for furnace and air conditioning units are typically placed in areas, such as in a corner of a room or in hallways, and which are often not well lighted. Thermostat controls are usually adjusted at night when natural lighting is not available. Thus, home owners often have a difficult time reading and adjusting thermostats. This problem is compounded for the elderly and to those having eyesight difficulties whom may need a flashlight, a match, a lighter or may need to light an adjoining space to make a thermostat reading and adjustment. The latter use of electrical energy, often involving 110 volts/100 watts or more, represents a high consumption of energy despite the world wide attempt to conserve electrical energy use. The lighting device of this invention provides an energy efficient means to momentarily illuminate a thermostat.

Various electrical appliances and/or controls for such appliances are used in households as well as in other settings. Often times, such appliances or controls require periodic monitoring or setting. For purposes of this patent application, a thermostat will be discussed and particularly, the lighting device of the present invention is constructed and arranged to provide a momentary light for a thermostat.

Despite the need for an economical, versatile, efficient and functional device to aid the reading and operation of electrical appliances, such as thermostats, none as far as is known has been commercialized. For example, U.S. Pat. No. 4,895,455 to Horning discloses a cover for a wall mounted thermostat having illumination and magnifying means, however, the components are mounted beneath the cover in the interior of the thermostat itself. U.S. Pat. No. 5,113,318 to Conley also discloses a thermostat light, however, the U-shaped device of this invention is bulky and limited in use with certain appliance designs. U.S. Pat. No. 5,491,615 to Nichols discloses a light attachment for a thermostat which includes a pivotally mounted telescoping arm. These prior art references disclose generally complex lighting devices which are limited in use and which are particularly difficult to adapt to existing thermostats.

It is an object of the present invention to provide a lighting device which is economical, efficient and constructed and arranged to be adapted on a variety of existing thermostat designs as well as other electrical and electronic appliances. The lighting device of the present invention provides a lighting unit which can be added to existing appliances or which can be incorporated into the original design and construction of the electrical or electric appliance to be illuminated.

It is another object to provide lighting structures having slip-in lighting modules comprising the bulb, energy source and switch. The slip-in module body may be used for a variety of lighting device structures and enables the lighting devices to be easily assembled and serviced when necessary. It is another object to provide lighting structures having a hood or cover adapted to provide light onto predetermined areas of a thermostat, appliance or selected area and the cover is constructed and arranged to receive the lighting module which permits the bulb and battery, for example, to be easily replaced.

It is another object to provide light unit structures integral with an annular cover or housing adapted to fit onto thermostats or other structures. Light unit structures are also provided for placement onto flat, round or any contoured surfaces of an appliance, for example, and having means for securing the lighting structure onto such surfaces of thermostats and other appliances. Removable light structures are also provided for use in emergency lighting situations when electrical power is disrupted, for example. Further, light structures are provided to be adapted for mounting on a door plate to illuminate the door entry and door handle areas. Other lighting structures are designed for multiple use, such as for various thermostat designs, emergency use, and mounting to locations, such as doors.

SUMMARY OF THE INVENTION

The lighting device of the present invention is comprised of a self contained base and hood structure which is mountable to an existing electrical appliance or which can be incorporated into the design and construction of the electrical appliance itself. When used with a thermostat, for example, the lighting device may be mounted onto the top of the thermostat cover or housing or it may be manufactured and sold as a device with a decorative thermostat cover and wherein the original thermostat ring is replaced by the decorative cover with integral lighting device, or wherein the decorative cover with light unit is mounted over an existing thermostat or similar appliance. The lighting devices may also be used in other applications as will be further described.

The lighting device is comprised of a self contained base structure which is adapted to be mounted to an electrical appliance or which may be constructed and arranged to frictionally fit into a hood or cover structure. The base structure has a cavity into which a battery, a light bulb and a conductive connector member with a switch is mounted. The switch, which is preferably of the momentary push down type, is connected for operation between the battery and the light bulb and is accessible outside the base structure and cover. The base structure may be provided with connecting means which permit the lighting device to be attached to the thermostat. The base structure may be flat or contoured to be aesthetically and securely mounted to the top of a thermostat or other appliance. A pair of opposing snap ridges may be utilized for this purpose, however, a fastener such as a screw or the like, an adhesive or adhesive layer with release liner may also be used for mounting the base structure to a thermostat.

A cover or hood is provided to receive the self contained base structure. The cover may also be mounted over the base structure. The base structure may be used with and placed into various cover structures and designs. The cover has a forward extending hood area which is adapted to direct the light from the light bulb to the area to be illuminated. The cover has an aperture or slot through which the switch is accessible for operation. The base structure contains a lighting module comprised of various components including, for example, a light bulb, a battery or batteries, a switch and a conductive connector member structure which communicate between these components. The base structure preferably slips into the cover and, preferably, is frictionally held therein. The base structure of the lighting device is constructed and arranged in a unique manner which provides an economical means to securely and effectively hold and interconnect these components in a unitary and self contained manner. The cover structure of the invention may also have various structures and designs including depending ring-like members whereby the cover is provided with means to frictionally receive the lighting module and the ring-like member is adapted to be mounted over appliances such as thermostats and door plates, for example. The cover structures may be decorative and adapted to receive informational or advertising materials.

These and other benefits of this invention will become clear from the following description by reference to the drawings.

DESCRIPTION OF THE PREFERRED EMBODIMENTS

The present invention relates to lighting devices for providing momentary lighting to specified areas, such as electrical and electronic appliances as well as other areas requiring illumination. The lighting devices of this invention are useful for those users having difficulty reading an appliance, such as a thermostat, for example. Thermostats are typically placed in dark areas such as hallways, which make them difficult to read and operate and particularly for the elderly or those having visual impairment. Although the lighting devices will be primarily discussed with respect to thermostats to control furnaces and air conditioning units, the lighting devices are also useful with other electric and electronic appliances such as VCR's, telephone caller ID's and the like as well as other areas. The teachings of this invention are also applicable to lighting devices that may be removable or used with or incorporated into other apparatus, for example, used to illuminate any desired location or area.

Figure 1:
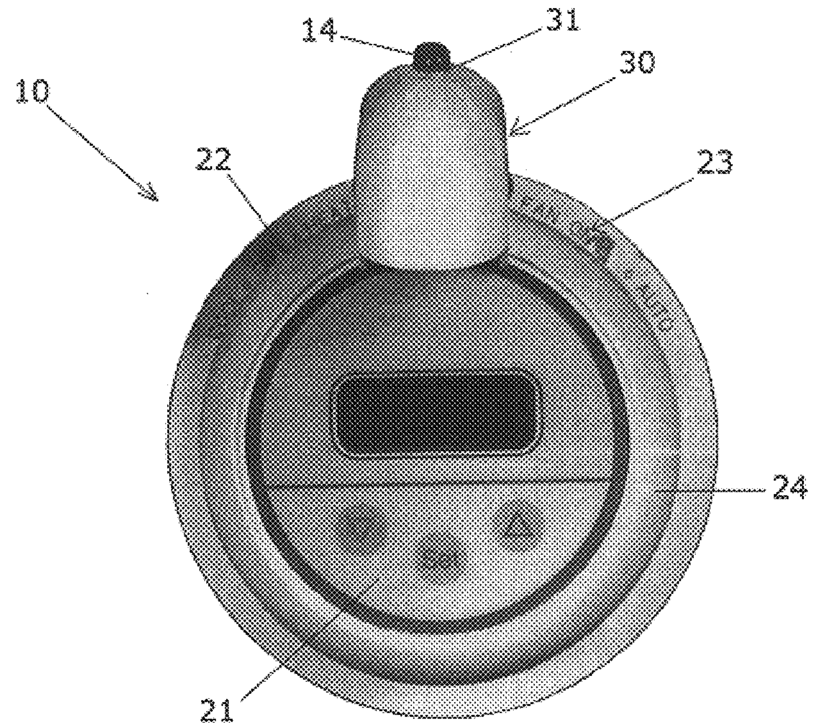
FIG. 1 is a front view of the lighting device mounted on a thermostat.

FIG. 1 is a front view of lighting device 10 shown mounted on top of thermostat 21. The thermostat 21 shown is a digital, programmable thermostat sold by Honeywell and which has a heat/cool setting 22 on its backplate as well as a fan setting 23. Thermostat 21 has a cover ring 24 which is generally not easily removed from the thermostat structure. The lighting device 10 is shown mounted to the top of the existing thermostat ring 24. The device 10 has a hood 30 which has a body design that does not impede the flow of air through the air channels of the thermostat 21. Hood 30 is further shown having a switch 14 extending through aperture 31.

The lighting device 10 is a compact self contained and adaptable unit. The lighting device 10 has an internal lighting structure beneath hood 30. The internal lighting structure comprised of a base structure, a light bulb, power means, such as batteries, and a switch mechanism. The internal lighting structure may have various embodiments as will be described.

Figure 2:
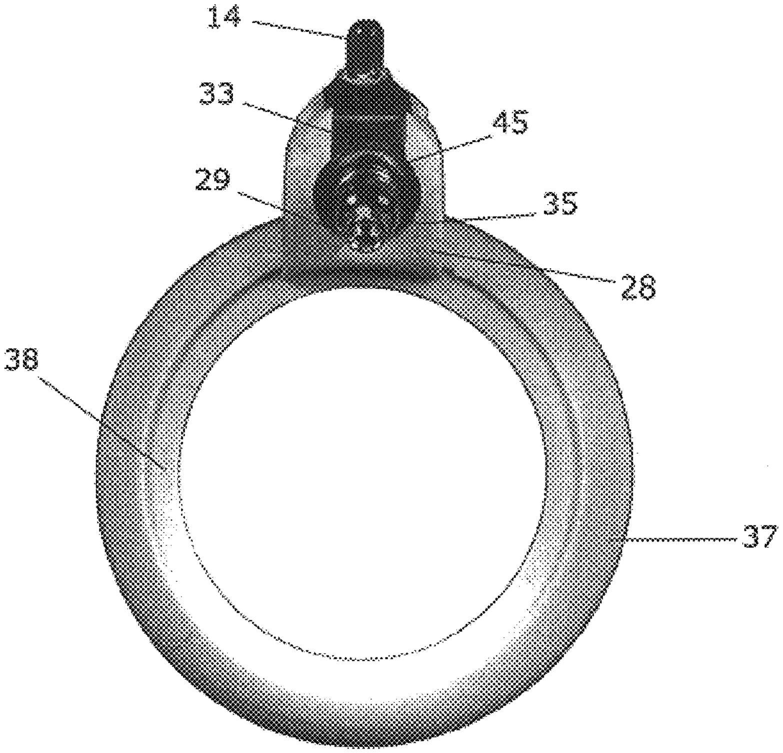
FIG. 2 is a front view showing the base structure of the lighting device mounted on a thermostat cover.

FIG. 2 is a front view showing the base structure 28 of lighting device 10 mounted on ring portion 37 which, as a unit with the lighting device 10 is adapted to surround a thermostat. The ring portion 37 is a replaceable ring for mounting on a thermostat and it is provided with a recessed inner ring 38. A conductive connector member 33 is mounted in the base structure 28 and the light bulb 29 extends outwardly through the front opening 35. A switch 14 extends upwardly from the conductive connector member 33. The conductive connector member 33 is secured within slot 36 and extends rearward and covers aperture 34 within base structure 28 wherein a battery is placed. The light bulb 29 is threaded into a socket area 45 of the conductive connector member 33 and extends above and outward from the ring 37. Contact by the conductive connector member 33 to the battery by means of pushing down the switch 14 completes the electrical circuit and causes light bulb 29 to illuminate. The light bulb 29 is positioned within the hood 30 so that when the switch 14 is activated, the readout and control areas of a thermostat are illuminated. Although various switches may be used within the purview of this invention, it is preferred that a momentary, hold down switch 14 be used. Thus, when illumination is desired, the switch 14 is merely pressed down and when the switch 14 is released, the light device is again in the off position. The momentary, hold down switch conserves both battery and bulb life by preventing the inadvertent continuous activation of the light device.

Figure 3A:
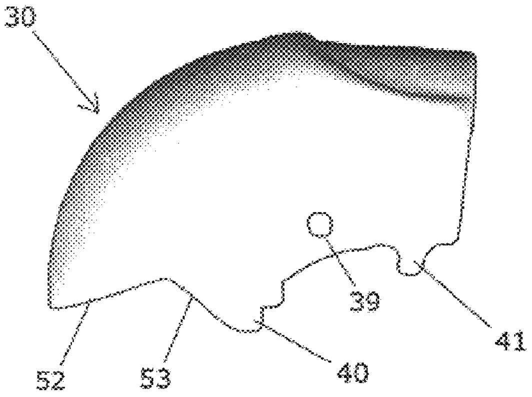
FIG. 3A is a side view of the hood cover of the lighting device.
Figure 3B:
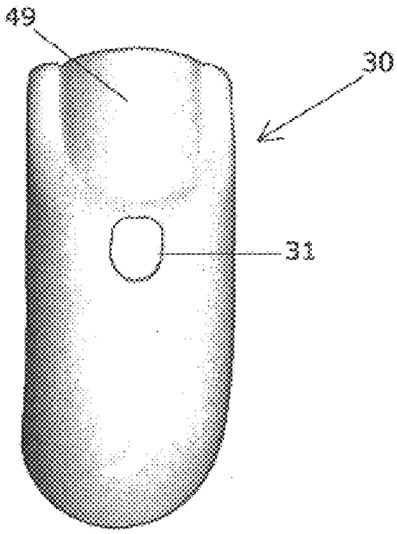
FIG. 3B is a top view of the hood cover of FIG. 3A.

FIGS. 3A and 3B show the hood or cover 30 removed from the base structure 28. The exterior cover 30 has a front sloping portion 52 and a rear sloping portion 53. The cover 30 is preferably molded of a rigid or semi-rigid unbreakable material including plastic compositions. For example, a material such as Lexan® or the like may be used. Cover 30 is shown to have a bottom peripheral shape to match that of the base structure 28. FIG. 3A is a side view of cover 30 and is shown to have front lips 40 and rear lips 41 which align with the opposing snap on ridges 42 and 43 of base structure 28, as shown in FIG. 4B. Upon securing the cover 30 to base 28, the lips 40 and 41 align and cover the sides of ridges 42 and 43 for aesthetic purposes. Aperture 39 in cover 30 allows a fastener, such as a screw or the like, to secure cover 30 to base structure 28. FIG. 3B is a top view of cover 30 having a rear indented area 49 and an aperture 31 for switch 14.

Figure 4A:
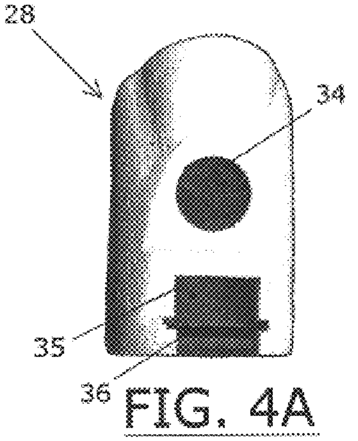
FIG. 4A is a top view of the base structure of the lighting device.
Figure 4B:
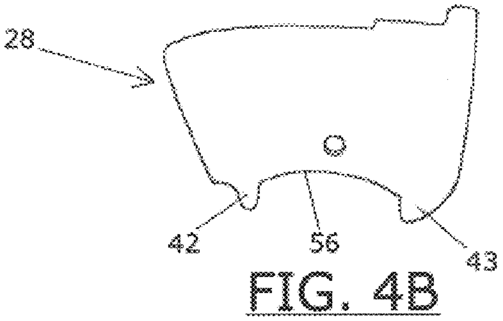
FIG. 4B is a side view of the base structure of FIG. 4A.

FIGS. 4A and 4B show base structure 28 which preferably is constructed of a nonconductive molded plastic material, i.e., urethane or the like. The base structure 28 may be injection molded and is shown to have various apertures, an internal cavity and aligned slots. The bottom 56 of the base 28 has a predetermined shape to mate with the appliance surface on which the lighting device is mounted, i.e., flat or contoured. FIG. 4A shows the base structure 28 having top aperture 34, front opening 35 and slot 36 which extends from the edges of the opening 35 and into the bottom of the base structure 28. Aperture 34 of base structure 28 allows switch 14 to extend through the base structure 28. Opening 35 and slot 36 of opening 35 hold conductive connector member 33 and light bulb 29 in base structure 28. FIG. 4B shows the opposing snap ridges or lips 42 and 43 of the base structure 28 and which secure base structure 28 of the light unit to thermostat cover ring 37. The base structure 28 is constructed to fit into the rear of the cover 30.

Figure 5:
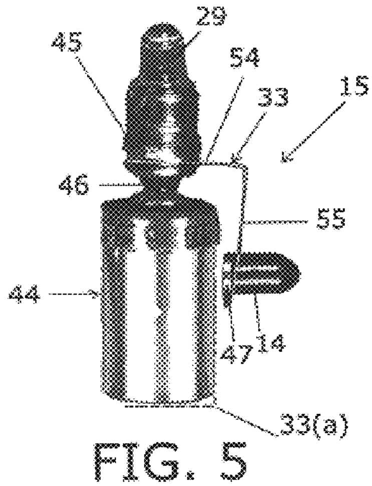
FIG. 5 shows the internal lighting structure including the battery, the conductive connector member, the light bulb, and the switch of the lighting device.

FIG. 5 shows an embodiment 15 of the internal lighting structure. The conductive connector member 33 provides the structural support and connection between the bulb 29, battery 44, and switch 14 and is shown to have a generally L-shaped configuration having legs 54 and 55. The switch 14 is shown attached by a fastener 47, such as a screw, to leg 55 of conductive connector 33. The light bulb 29 is shown screwed into internally threaded socket area 45 on the adjoining leg 54 of conductive connector strip 33 to expose bulb contact end 46. A battery 44 is also shown and which is placed within the cavity of base structure 28. Upon placement of these components within base structure 28, the light bulb 29 is threaded through socket area 45 to secure the battery 44 within the cavity of base structure 28. The downward movement of switch 14 contacts the conductive side of battery 44 which completes the circuit causing light bulb 29 to illuminate. The release of switch 14 opens the circuit as a result of the inherent spring-like properties of the conductive connector strip 33. Alternatively, conductive connector member 33(*a*) is shown extending from the rear of the battery and to below the switch 14. The conductive connector member 33(*a*) may be used if the battery 44 has a non-conductive side wall.

The light bulb 29 used in the internal lighting structure is preferably a premium grade 2.25 volt, 0.25 amp bulb although other bulb specifications may be utilized within the purview of this invention depending upon the battery type. The battery 44 may be any suitable battery or batteries, for example a 3 volt, 750 ma lithium battery and the conductive connector members 33 and 33(*a*) are preferably phosphorous bronze strips having a thickness range of approximately 0.006 to 0.014 inches and having a width of approximately 0.5 inches. The conductive connector strip 33 is bent into a predetermined L-shape which is secured into the slots of the base 28 and communicates with the battery 44 and bulb 29. The phosphorous bronze members 33 and 33(*a*) have been found to provide the proper electrical conductivity, physical strength, flexibility, and resilience required for use in the lighting device 10. However, as known by those skilled in the art, other bulb types, batteries, i.e., batteries in series, and conductive members may be used within the purview of this invention.

Figure 6:
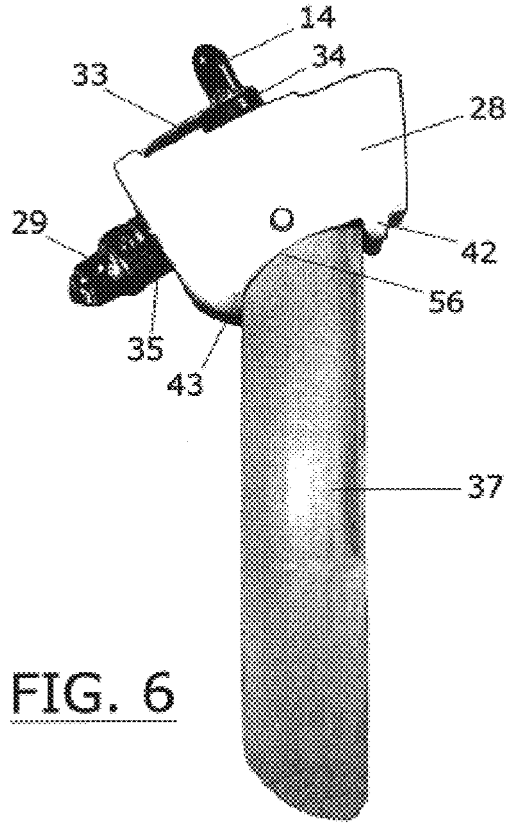
FIG. 6 is a side view of a thermostat cover and the base structure of a lighting device mounted thereon.

FIG. 6 shows base structure 28 mounted to ring 37 which is constructed and arranged as a replacement cover ring for use on circular thermostats. Base member 28 is shown mounted to ring 37, however, as will be further described, various methods and structures may be used to mount the light unit 10 to a thermostat. Essentially, the method and structure is dependent upon whether the light device 10 is an aftermarket item, whether it is incorporated with a replacement thermostat ring structure and whether the ring of the thermostat is removable. FIG. 6 shows the front ridge 43 and rear ridge 42 snapped over the thermostat ring 37. The bottom 56 of base structure 28 is shown having the contour of thermostat ring 37. Light bulb 29 extends from opening 35 of base structure 28 and connective conductor member 33, and switch 14 extends from aperture 34 of base structure 28.

Figure 7:
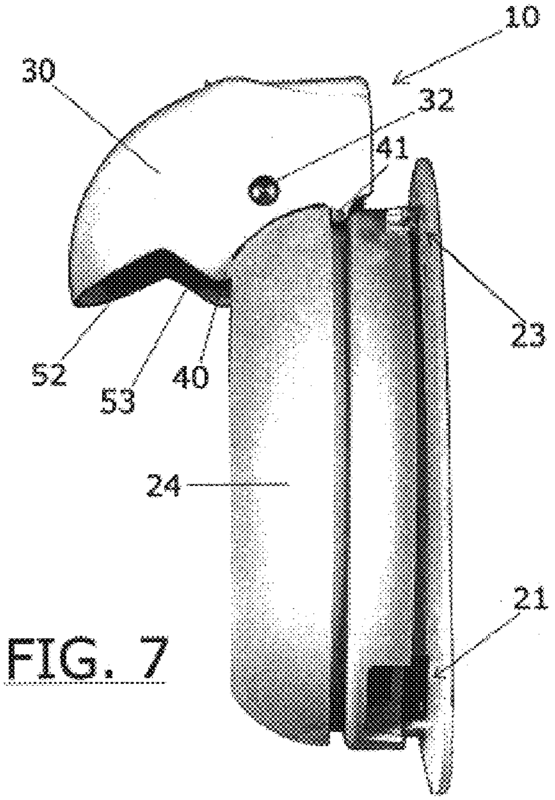
FIG. 7 is a side view of the lighting device mounted on a thermostat.
Figure 9:
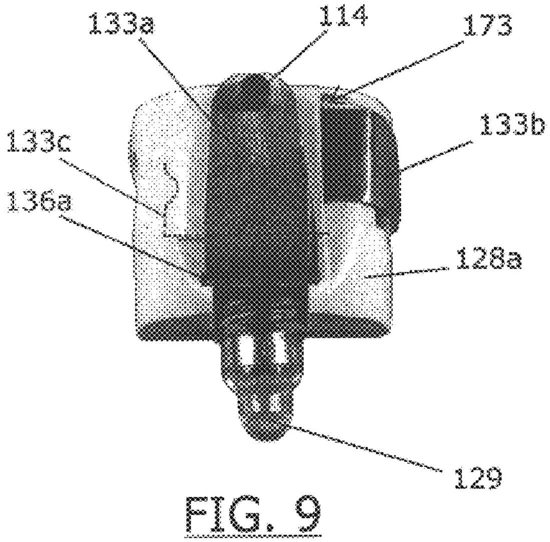
FIG. 9 is a top perspective view of another embodiment of the internal light structure used in the lighting device of the present invention.
Figure 10:
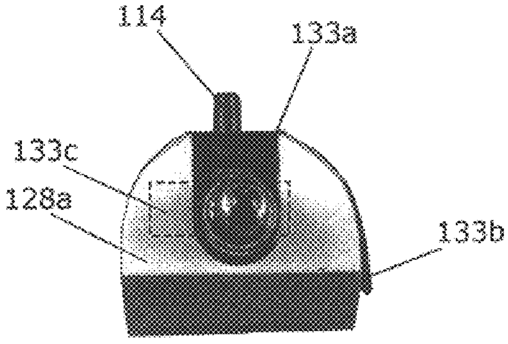
FIG. 10 is a front view of the structure of FIG. 9.
Figure 11:
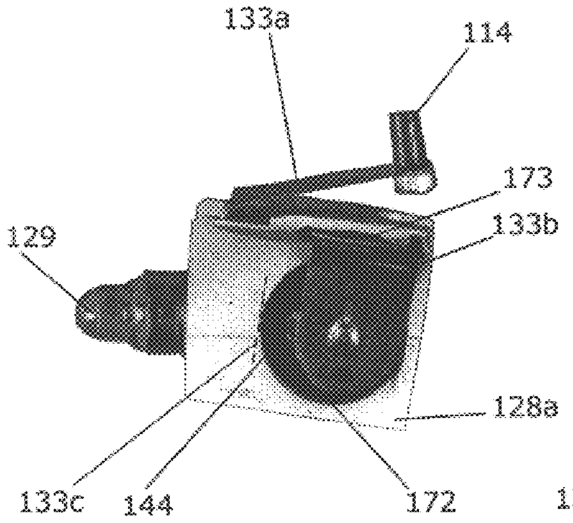
FIG. 11 is a side view of the structure of FIG. 9.
Figure 12:
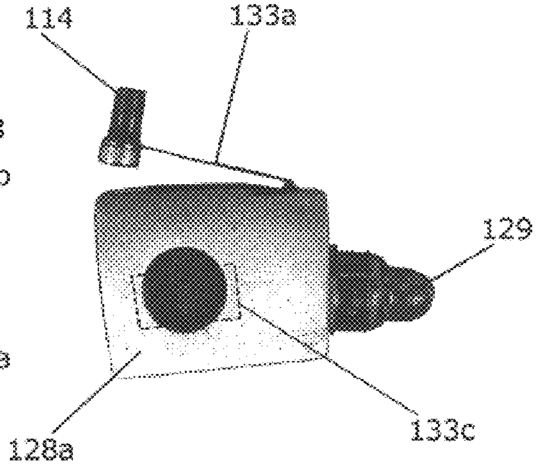
FIG. 12 is a view of the opposite side of the structure of FIG. 11.
Figure 13:
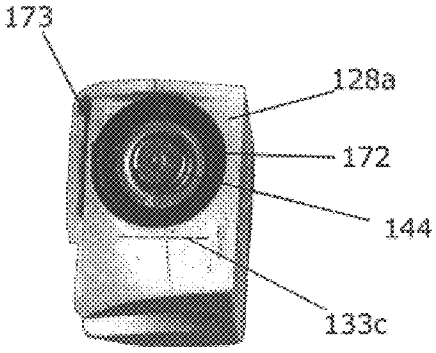
FIG. 13 is a side view of the structure shown in FIG. 9.
Figure 14:
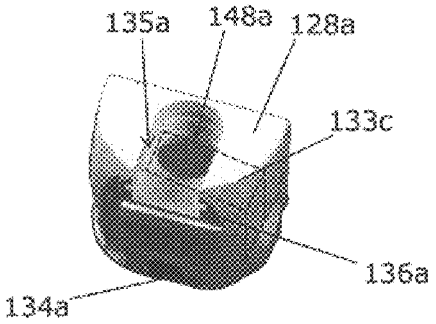
FIG. 14 is a front view of the structure of FIG. 13.
Figure 15A:
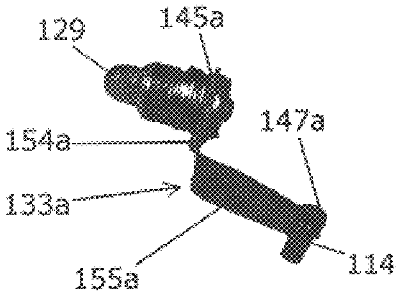
FIG. 15A is a perspective view of the conductive connector member of the invention.
Figure 15B:
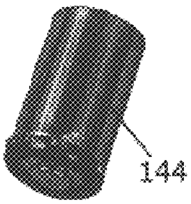
FIG. 15B is a top view of a battery used in the present invention.
Figure 15C:
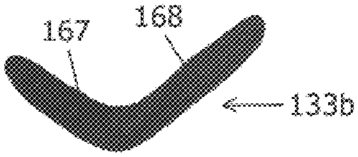
FIG. 15C is a perspective view of a conductive connector member of the invention.
Figure 15D:
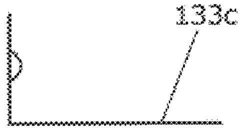
FIG. 15D is a lateral plan view of a conductive connector member used in the lighting structure of the invention.

FIG. 7 shows cover 30 over base structure 28 by threaded fastener 32 and the lighting device 10 mounted to thermostat ring 24 of a thermostat. The thermostat ring 24 is part of the thermostat and thus, light device 10 is mounted to thermostat ring 24 of the thermostat. The cover 30 is shown to have a forward sloping hood portion as defined by front edge 52. Further, a rearward sloping edge 53 extends downwardly toward the thermostat ring 24. This forward hood of cover 30 configuration in conjunction with a reflective interior surface of the cover, for example, directs light toward the front of the thermostat for reading and control purposes. The curvature of the hood of cover 30 provides a reflective light for illuminating the reading and control area of the thermostat. As shown, the cover 30 is curved along its length as well as in the direction perpendicular to its length. The curved forward end of the hood may be hemispherical in shape having a diameter of approximately 0.75 inches, for example.

Although the lighting device of the present invention has been shown and described for use with circular cover ring having a curved periphery, the lighting device may also be used on flat or other contoured surfaces or structures. For example, rectangular thermostats, VCR's, telephone caller ID units and other appliances, may have flat or contoured mounting surfaces. In the latter cases, the base 28 may be flat or contoured to mate with the appliance surface on which it is mounted and then is positioned at the peripheral edge of the electrical or electronic appliance. The cover 30 extends over the forward edge of the base member 28 and direct light to the operating or readout portion of the appliance.

Figure 8:
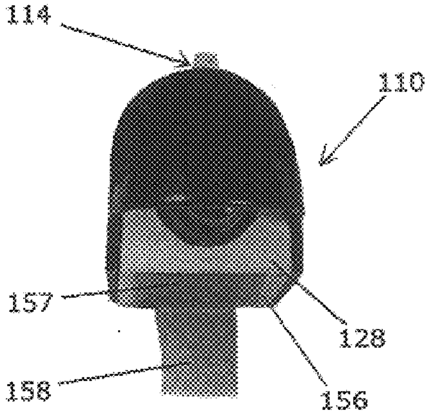
FIG. 8 is a front view of the lighting device and showing an adhesive layer mounted on the bottom thereof.

FIG. 8 shows a frontal view of lighting device 110 having interior base member 128. The base 128 has a flat bottom 156 having an adhesive layer 157 and release liner 158 for attachment to any desired flat surface, for example. Switch 114 extends from the device outer cover which is shown to have flat bottom sides.

Referring to FIGS. 9–14, another embodiment of the internal light unit which includes the base structure 128(*a*) is shown. It is within the purview of this invention to utilize the unitary, slip-in base 128(*a*) into a variety of lighting device structures. Base structure 128(*a*) is designed having a rear area which is larger than its front area, for example, to ease insertion into to cooperate and to be frictionally held in place in the cover of the lighting device. Base structure 128(*a*) is generally a hemispherical structure in cross-section having a plurality of apertures and front and rear flat surfaces. The light bulb 129 extends from base structure 128(*a*). The slip-in base structure 128(*a*) is shown to have a two part conductive connector member 133(*a*) and 133(*b*) which respectively make contact with each other and illuminate light bulb 129 when switch 114 is depressed. Conductive connector member 133(*a*) is held in retaining slot 136(*a*) and conductive connector member 133(*b*) is held in slot 173. The conductive connector members 133(*a*) and 133(*b*) which, when activated by switch 114, illuminate light bulb 129. As shown, strip portion 133(*a*) is perpendicularly aligned with strip member 133(*b*) at the top of the base structure 128(*a*) whereby switch 114 is aligned for contact with member 133(*b*). Battery 144 is shown contained in cavity 172. As previously described the battery 144 has a conductive peripheral wall which is used to complete the circuit. Alternatively, as shown in FIGS. 9–14, the conductive connector member may be comprised of a three part structure, to include conductive connector member 133(*c*) if the battery does not have a conductive side wall. The conductive connector member 133(*c*) is also a strip of like construction as the other members discussed. Switch 114 is shown mounted to conductive connector member 133(*a*) and light bulb 129 is shown extending from base structure 128(*a*) through front opening 148(*a*). Switch 114 is shown positioned above opening 134(*a*). Also shown is retaining slot 136(*a*) which retains leg 155(*a*) of conductive connector member 133(*a*).

FIGS. 15A–15D show the elements placed in base structure 128(*a*) and which make up the internal lighting unit of the invention. The conductive connector member 133(*a*) is shown comprised of legs 154(*a*) and 155(*a*), although leg 133(*c*) may be utilized depending upon battery structure. Threaded socket area 145(*a*) of leg 154(*a*) retains light bulb 129. Momentary switch 114 is shown attached to leg 155(*a*) by a conductive fastener 147(*a*). Conductive connector member 133(*b*) has legs 167 and 168. The battery 144 is shown to have a conductive side wall which is important in several embodiments of the lighting device. The conductive connector members may be arranged, however, so that any battery or number of batteries may be utilized.

Figure 16:
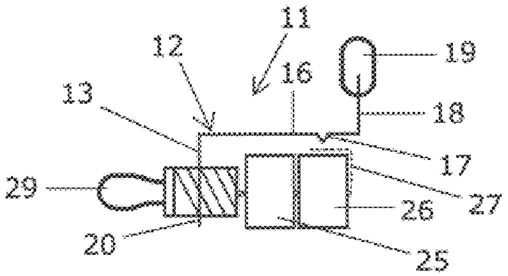
FIG. 16 shows another embodiment of the internal lighting structure of the invention.
Figure 17:
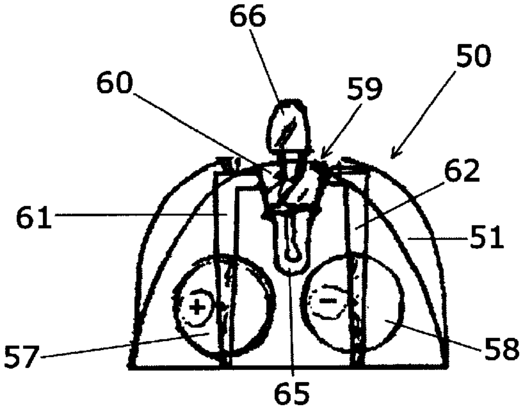
FIG. 17 is a front view of another embodiment of the internal light structure used in the invention.
Figure 18:
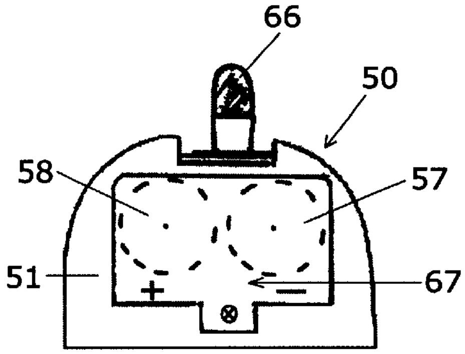
FIG. 18 is a rear view of the structure of FIG. 17.
Figure 19:
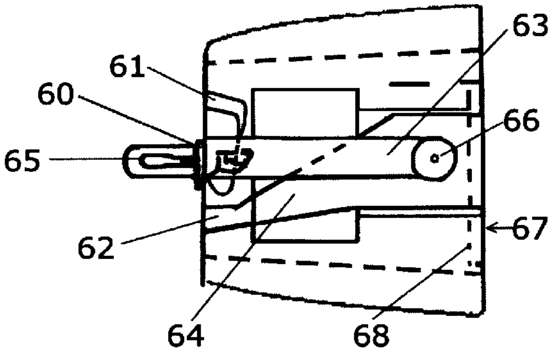
FIG. 19 is a top view of the structure of FIG. 17.
Figure 20:
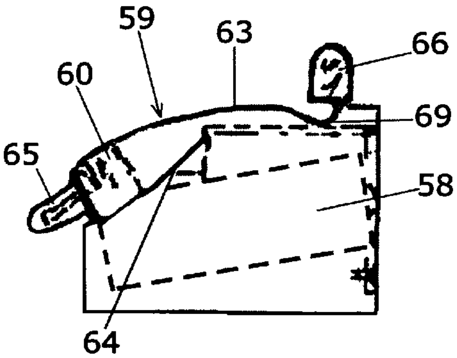
FIG. 20 is a side view of the structure of FIG. 17.

FIG. 16 shows another embodiment of the internal lighting structure 11 that may be utilized in the base structures of the lighting devices. As shown, the internal structure 11 has a conductive connector member 12 having a vertical leg 13, a horizontal leg 16 and an upwardly extending leg 18 having a rubber or plastic tip 19. The horizontal leg 16 has a contact protrusion 17 which contacts the side of a battery to complete the electrical circuit. The vertical leg 13 has a threaded socket 20 to threadingly receive bulb 29. The power component of this internal lighting structure 11 is shown to comprise two batteries 25 and 26 which may be 1.5 volt battery cells to provide 3 volts in series. Thus, one or more batteries may be used, and as shown, a conductive member 27 may be used with batteries not having the conductive side wall. The conductive connector member 12 is designed to be a unitary structure suitable for inexpensive manufacture, i.e., via a punch press. The conductive connector member 12 may include a second part 27 extending between the battery negative end and the switch position. The composition of the conductive connector member 12 is preferably the same construction as the phosphorous bronze strip 33 previously described.

FIGS. 17–20 show another internal light unit embodiment 50 of the invention. The internal lighting module 50 is shown having a base 51 wherein batteries 57 and 58 are disposed in a cavity of the molded base 51 and wherein a conductive connector structure 59 is used to interconnect the batteries, the bulb 65, and switch 66. As shown, bulb 65 extends from a socket 60 which is electrically connected to the positive end of battery 57 by means of conductive member 61. The conductive member 61 is shown extending under conductive strip member 63 and connects to the positive end of the bulb socket 60. Conductive strip member 63 shown is connected to the negative side of the socket 60 and switch plunger 66 is shown mounted at the end of the strip member 63. The switch 66 includes a plunger member and below which a contact protrusion or bend 69 is located. The springy nature of conductive strip 63 provides the momentary operation of the light unit as switch 66 is depressed to contact conductive member or strike pad 64 which has conductive leg 62 that contacts the negative end of battery 58. Rear cover 67 having conductive member 68 on its inside wall retains the ends of batteries 57 and 58. The batteries 57 and 58, therefore, are connected in series and may be N-size batteries (1.5 volt, alkaline batteries). As shown, the batteries are angularly disposed in an internal cavity of the base member 51. As discussed with respect to the other embodiments of the internal light modules of the invention, the base member is preferably molded of a nonconductive plastic material and is tapered in configuration to slip in and be frictionally retained in the end of the lighting device cover structures. Various apertures or openings and retention structures may be used to connect and retain the bulb, power source and switch member in the base member for cooperative use with the cover and hood structures of this invention.

Figure 21:
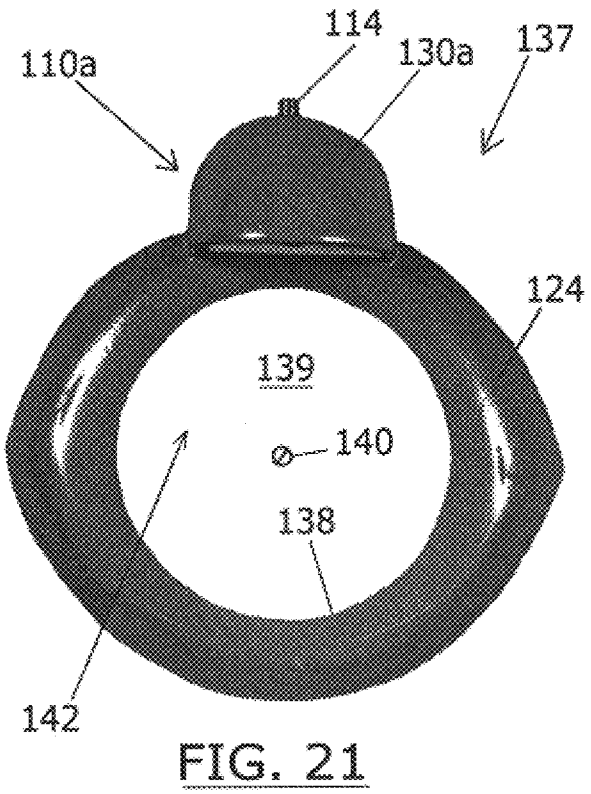
FIG. 21 is a front view of another embodiment of the unitary molded lighting structure of the invention.
Figure 22:
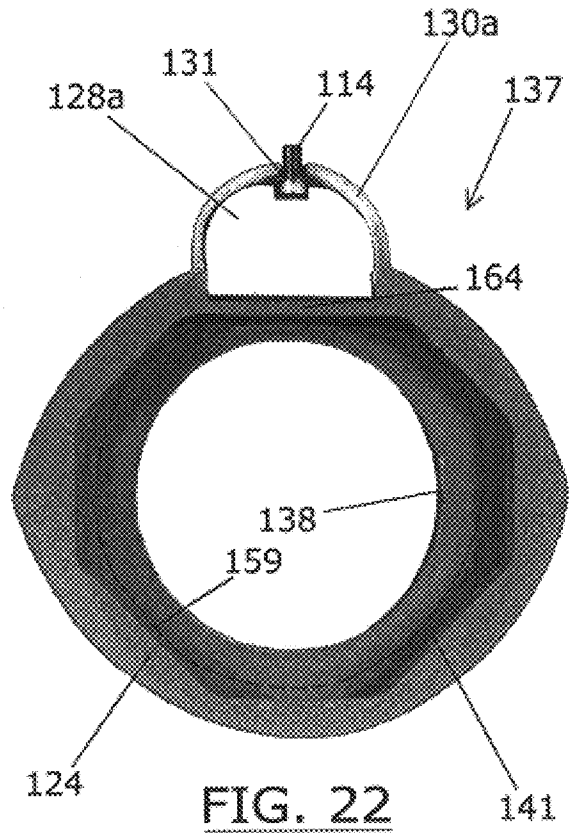
FIG. 22 is a rear view of the embodiment of FIG. 21.

FIGS. 21 and 22 show front and back views of a unitary molded structure 137 including a cover structure 110(*a*) connected to a ring-like cover portion 124 with an inner opening 138. Base structure 128(*a*) slides into cover 130(*a*) above bottom ridge or ledge area 164. Inner opening 138 is shown to have a 24 sided aperture and the rear opening 159 is shown to be an eight sided polygon which frictionally engages a circular mounting structure. Other opening and rear mounting configurations may be used according to this invention. Embodiment 137 is shown and described to be used to replace an existing thermostat cover and to provide a more aesthetically pleasing and functional lighting device for a thermostat, however, other uses are also anticipated.

A mounting plate and cover retainer structure 139 is shown in FIG. 21. The mounting structure 139, for example, may comprise a circular disc that is fastened to a door or wall by means of screws. The mounting structure 139 may have a centrally disposed spacer which projects the disc from the wall to thereby allow the lighting device to be mounted over the plate by means of cover retainer and screw 140 which engages the centrally disposed spacer of the mounting plate. An informational button 142 may be inserted into the inner opening 138, and which when retained may cover the opening edge 138. As shown in FIG. 22, the dotted circle 141 represents the peripheral edge of the mounting plate 139, or of a circular thermostat and which frictionally fits into the rear opening 159 (polygon walls) of the depending cover structure 124. The lighting device portion 110(*a*) directs light downwardly onto a door area, for example, may illuminate informational or advertising materials 142 placed on mounting plate 139. As discussed, the lighting and cover device 137 may be easily removed from a thermostat and utilized by a user for emergency purposes.

In summary, the molded lighting device embodiment 137, shown in FIGS. 21 and 22, as well as the other lighting device structures of this invention having a ring structure extending from the light cover, i.e. FIGS. 1, 2, 6, and 23–26, all may be used in a variety of settings and for a variety of purposes. The use of these lighting device embodiments in connection with an adapter or mounting structure on a door or in a door entry area being one of such uses.

Figure 23:
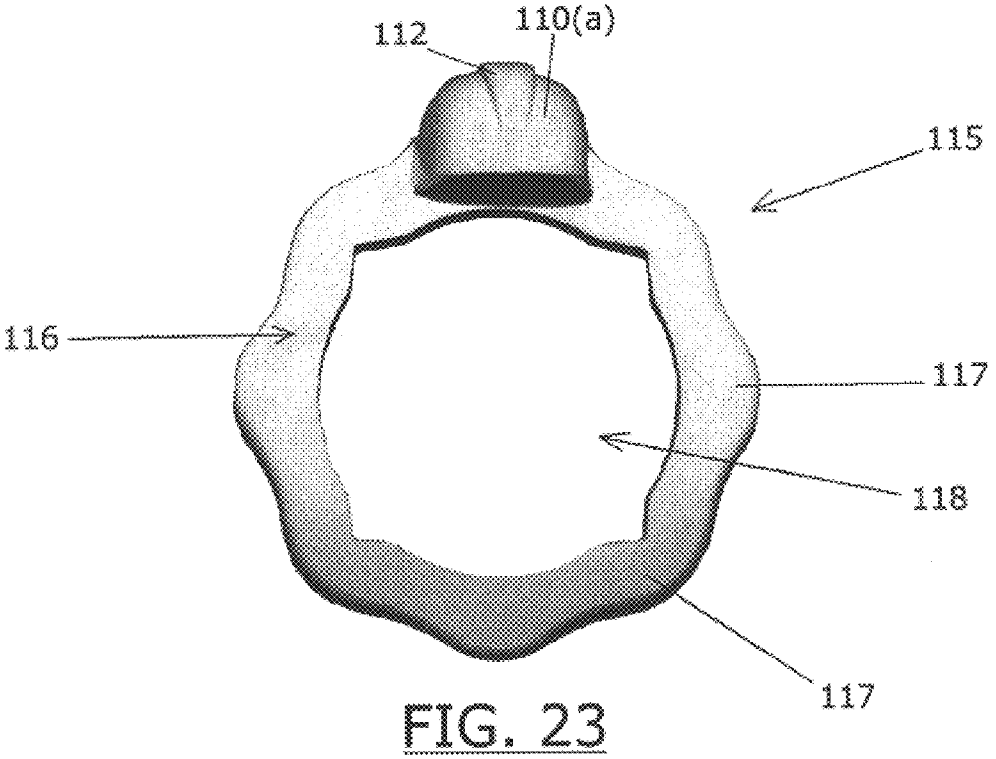
FIG. 23 is a front view showing another embodiment of the unitary molded lighting structure of the invention.
Figure 24:
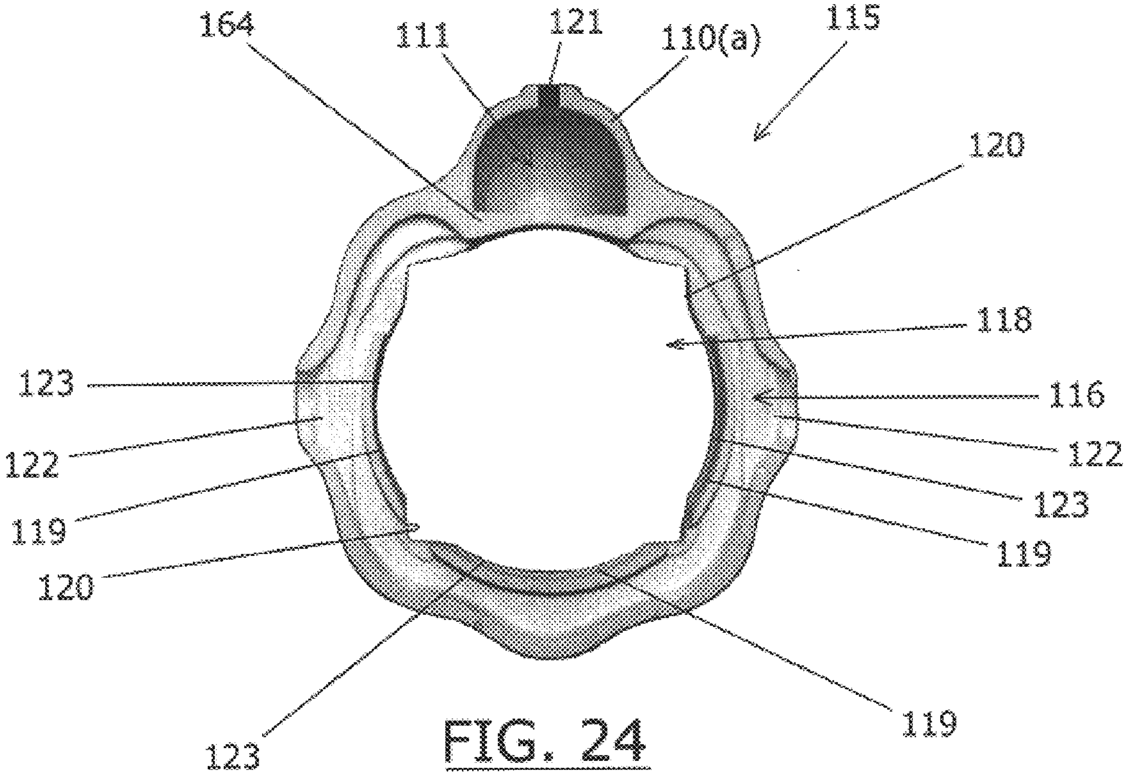
FIG. 24 is a rear view showing the embodiment of FIG. 23.

FIGS. 23 and 24 are front and rear views, respectively, and showing another embodiment of the unitary molded lighting structure. The unitary structure 115 is comprised of a cover structure 110(*a*) having a cavity 111 and a thermostat connecting ring portion 116 with a plurality of peripheral decorative outer segments 117. FIG. 24 further shows the device cover 110(*a*) having a decorative element 112 molded on its top. The connecting ring 116 has a centrally disposed opening 118 with beveled interior walls 119 sloping from the front to the rear for engaging the exterior of a thermostat, for example. The ring 116 has finger slots 122 and opposing stop portions 123 to permit the embodiment 115 to be used on an existing thermostat without impeding its functions. The embodiment 115 is constructed and arranged to be placed about an existing thermostat including its outside cover i.e., a standard LUX thermostat or a Honeywell thermostat, for example. Thus, the embodiment 115 is a multifunctional structure that has a ring 116 structure having a decorative front and rear structure adapted to engage various objects. For example, the tapered corner walls 120 engage a square-like structure and the tapered circular walls 119 engage a circular-like structure. The four opposing stop segments 123 permit the embodiment 115 to be placed over an existing circular thermostat without impeding any functions. The structure 115 may also be attached to a circular or square shaped base which may be mounted on a door, for example. The cover structure 110(*a*) is similarly constructed as previously described to receive the unitary lighting base units of the invention. The cavity 111 defined by the cover 110(*a*) and a ridge or ledge member 164 and between which the base structure and internal lighting structure may be frictionally held. The rear of the device cover 110(*a*) is shown to have a slot 121, to receive the switch actuator of the various lighting modules shown and described.

Figure 25:
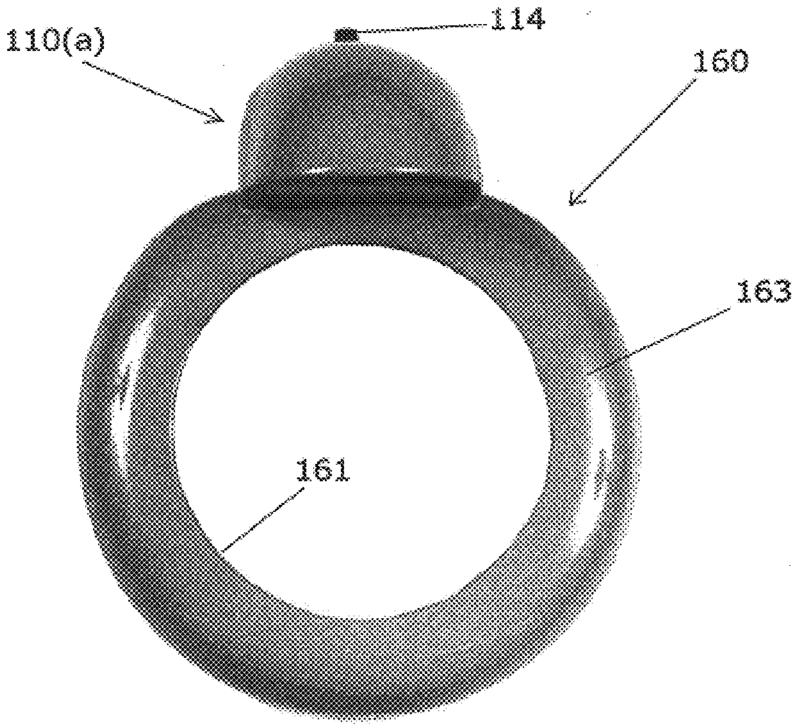
FIG. 25 is a front view showing another embodiment of the unitary molded lighting structure of the invention.
Figure 26:
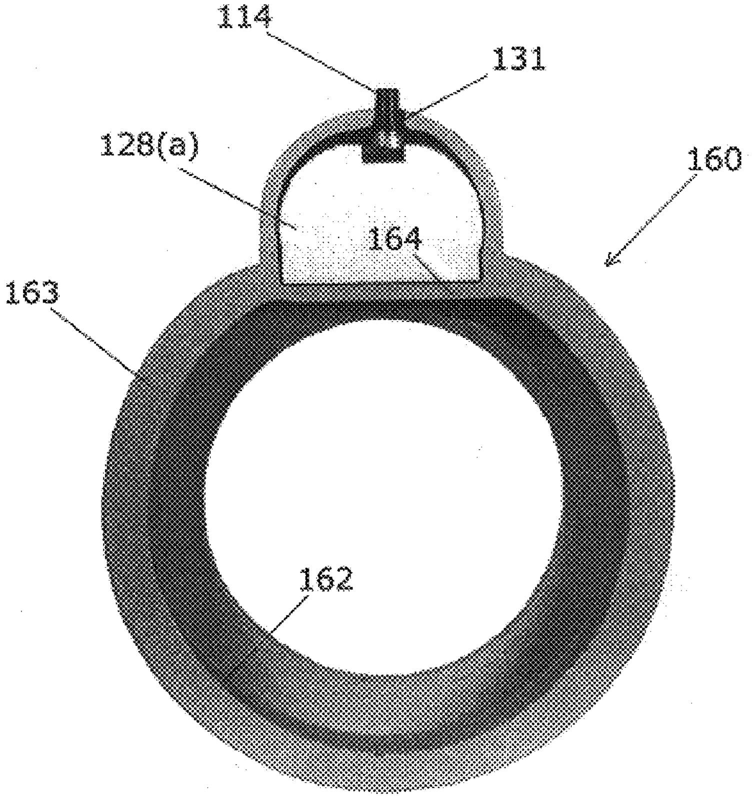
FIG. 26 is a rear view of the embodiment of FIG. 25.

FIGS. 25 and 26 show another embodiment 160 of a thermostat cover ring. The cover ring embodiment 160 has a cover ring structure 163 with an inner opening 161 and a rear opening 162 to replace a standard thermostat cover. The lighting device cover 110(*a*) is shown molded with the cover ring 163 and a bottom ridge or ledge 164 is disposed in the rear of the embodiment 160 to frictionally receive the base structure 128(*a*) having the internal lighting structure including the momentary switch 114 which is shown extending through slot 131 in the rear of the lighting cover.

The lighting devices of FIGS. 1, 2, 6, and 7 when used with a thermostat may be rotatable 360° along with the ring cover to thereby direct light onto any desired portion of a thermostat. Thus, although the lighting devices are shown in the 12 O'Clock position with respect to the thermostat, the rotation of rings 24 and 37 having the lighting device 10 mounted thereon, through a 360° rotation, will direct light to any desired area. The lighting devices and other embodiments of the device may be painted or molded of any desired color or to have a distinctive, decorative color and/or logo for advertising and promotional purposes.

As many changes are possible to the methods of this invention utilizing the teachings thereof, the descriptions above and the accompanying drawing should be interpreted in the illustrative and not the limited sense.

What is claimed is:

1. A lighting device comprising:

a) a nonconductive base member having a cavity therein, said cavity in said base member being constructed and arranged to have a light emitting source, a power source and a switch;

b) a cover structure having a forward curved hood and a rear portion for receiving said base member; and c) a ring member extending downwardly from said cover structure.

2. The lighting device of claim 1, wherein said cover structure is formed of a molded plastic and wherein a ledge extends between said cover structure and said ring member.

3. The lighting device of claim 2, wherein said base member has a tapered configuration and is frictionally held in said rear portion of said cover structure.

4. The lighting device of claim 2, wherein said ring member has a decorative front and a rear connecting structure constructed and arranged to frictionally engage an appliance.

5. The lighting device of claim 4, wherein said rear connecting structure includes a tapered surface constructed and arranged to engage an appliance selected from the group of appliances including a thermostat, a thermostat inner member and a mounting plate.

6. A lighting device for appliances, said device comprising:

a) a base structure having a cavity, an aperture, an opening, and a slot in said opening;

b) a conductive connector member positioned in said slot in said opening of said base structure, and a switch in communication therewith, said switch extending through said aperture of said base structure;

c) a light emitting source positioned in and extending from said base structure, said light emitting source having a contact end, said light emitting source extending through said opening of said base structure;

d) power source means in communication with said light emitting source and being positioned in said base structure cavity;

e) said cavity in said base structure further having means for supporting said conductive connector member, said switch, said light emitting source and said power source means;

f) a cover structure having a forwardly extending hood and being constructed and arranged to receive said base structure whereby said hood extends below said light emitting source, said cover further having an aperture through which said switch is accessible for activation; and g) means to secure said lighting device to an appliance.

7. The lighting device of claim 6, wherein said base structure has a bottom, and wherein said bottom has an adhesive layer with a release liner mounted thereto.

8. The lighting device of claim 6, wherein said base structure has a bottom and opposing snap ridges extending therefrom.

9. The lighting device of claim 6, wherein said means for securing said lighting device to an appliance comprises said cover structure having a bottom, said cover structure being comprised of a unitary molded structure including a ring-like portion extending from said cover structure bottom, said ring-like portion being constructed and arranged to engage an appliance selected from the group of appliances consisting of a thermostat, a VCR, a caller ID, and a mounting plate.

10. The lighting device of claim 6, wherein said conductive connector strip is a phosphorous bronze strip having a thickness range of approximately 0.006 to 0.014 inches and having a width of approximately 0.5 inches; wherein said light emitting source is a premium grade 2.25 volt, 0.25 amp bulb and wherein said power source means is a 3 volt, 750 milliamps per hour lithium battery.

11. The lighting device of claim 6, wherein said power source means is comprised of at least one battery having a conductive wall.

12. A lighting device for appliances said device comprising:

a) a base structure having a bottom, a cavity, an aperture, an opening, and a slot in said opening;

b) said cavity in said base structure having means for supporting a conductive connector member, a switch, a light source, and a power means;

c) said switch being positioned on said conductive connector member which provides electrical communication between said light source and said power means, said conductive connector member being positioned in said slot in said opening of said base structure;

d) said switch extending through said aperture of said base structure and said light source extending through said opening of said base structure; and e) a cover structure having a bottom and a forwardly extending hood and being constructed and arranged to receive said base structure whereby said hood extends below said light source, said cover further having an aperture through which said switch is activatable.

13. The lighting device of claim 12, wherein said lighting device has means for securing said device to an appliance, said means being a member of the group of securing means consisting of an adhesive layer with a release liner attached to the bottom of said base structure, opposing snap ridges extending from the base structure bottom and a unitary molded structure including a ring-like portion extending from said cover structure bottom, said ring-like portion being constructed and arranged to engage an appliance.

14. The lighting device of claim 12, wherein said conductive connector member has at least one part and is constructed of a phosphorous bronze strip and wherein said switch is a momentary switch.

15. A lighting device for thermostats, said device comprising:

a) a base structure having a bottom and having a cavity therein;

b) a conductive connector member and a switch;

c) a light emitting source having a contact end, said light emitting source extending from said base structure;

d) power source means positioned in said cavity of said base structure and being constructed and arranged to be in communication with said light emitting source; and e) a cover structure having a forwardly extending hood and being constructed and arranged to hold said base structure whereby said hood extends below said light emitting source, said cover further having an aperture through which said switch is accessible for activation.

16. A lighting device as in claim 15, wherein said cover structure includes a ring-like portion extending from the bottom thereof, said ring-like portion being constructed and engage an appliance.

17. The lighting device of claim 6, wherein said means to secure said lighting device to an appliance is a mounting plate having means to attach said mounting plate to a door.

18. The lighting device of claim 16, wherein said lighting device further comprises a mounting plate for attachment to a door, said mounting plate being constructed and arranged to receive said ring-like portion of said cover structure.

19. The lighting device of claim 12 wherein said means for securing said device to an appliance further comprises a ring-like portion extending from said cover structure bottom and a mounting plate constructed to receive said ring-like portion of said cover structure.

20. The lighting device of claim 19 wherein said mounting plate further has informational or advertising materials thereon.

* * * * *